United States Patent Office 3,302,320
Patented Feb. 7, 1967

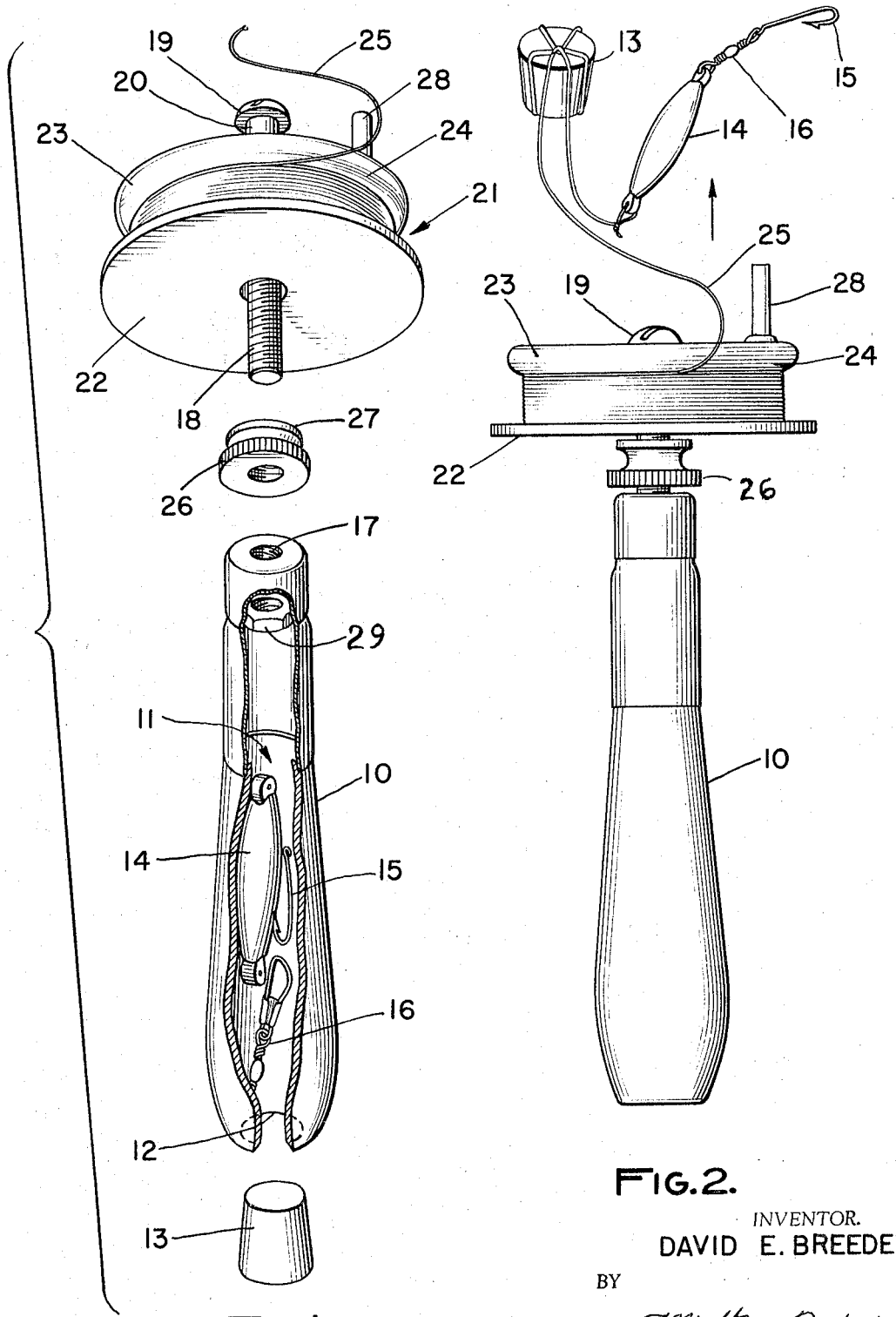

3,302,320
FISHING APPARATUS
David E. Breeden, 1951 S. Newell Road,
Malibu, Calif. 90265
Filed Nov. 3, 1964, Ser. No. 408,494
3 Claims. (Cl. 43—18)

This invention relates to fishing apparatus and more particularly to an improved fishing reel and handle structure facilitating casting and drop line operations.

Various types of conventional spinning reels are available for use with rods in accordance with particular fishing conditions. For example, ocean fishing gear, fly rods and reels, and other specialized fishing equipment are available on the market to satisfy the needs and desires of most fishing sportsmen. However, most of this equipment is relatively expensive and is unduly complex for the novice or individual who may be doing occasional fishing from a pier, dock, or the like.

In view of the foregoing, many individuals employ a drop line, as it is termed in the art, which merely comprises in its basic form a line wrapped about a frame structure together with the necessary tackle such as sinker and hook attachments. A need, however, has developed for a drop line which will perform the basic functions of a more sophisticated type of reel and rod without requiring the use of an expensive rod and complicated reel mechanisms.

With the foregoing in mind, it is accordingly a primary object of this invention to provide an improved fishing apparatus which is very economically fabricated of a minimum number of parts and yet which will satisfactorily meet most normal fishing requirements.

More particularly, it is an object to provide an improved fishing apparatus in which simple drop line type fishing can be carried out and also in which casting of a fishing line is possible without the necessity of expensive and bulky equipment.

Still another object is to provide an improved compact fishing apparatus which may be handled with one hand insofar as either drop line fishing or casting are concerned, which is very portable and in a preferred embodiment, incorporates means for housing normal fishing tackle all to the end that an inexpensive and highly versatile fishing apparatus may be made available to novice sportsmen.

Another object is to provide an improved fishing apparatus which is ruggedly constructed and very simple to operate and which has most of the advantages of conventional spinning type reels including simple brake or friction means for holding the reel in a given rotative position.

Briefly, these and many other objects and advantages of this invention are attained by providing an elongated handle structure, a single elongated shaft having a threaded end portion receivable in axial alignment in threaded engagement with one end of the handle structure, and a reel rotatably mounted about the shaft. Also included is a friction providing nut threaded on the portion of the shaft received within the handle in a position to be readily rotated by a user's thumb while grasping the handle to frictionally engage the reel and thus hold it in any desired rotative position.

In accordance with one embodiment of the invention, the handle itself is hollow for housing normal tackle equipment used with the fishing line on the reel. In this respect, a feature of the invention includes the provision of a cork for closing off a lower access opening in the handle to retain tackle within the handle, this cork also serving the function of a simple float for the fishing line during fishing operations.

A better understanding of the invention will be had by now referring to a preferred embodiment thereof as illustrated in the accompanying drawings, in which;

FIGURE 1 is an exploded prespective view of the basic components making up the fishing apparatus of this invention; and, FIGURE 2 is an elevational view of the various components of FIGURE 1 in assembled condition preparatory to using the fishing apparatus.

Referring first to FIGURE 1, the fishing apparatus includes an elongated handle 10 having an interior hollow portion 11 which opens at the lower end of the handle in an access opening 12. A float or cork 13 is arranged to be received within the access opening 12 so that various pieces of tackle such as the sinker 14, fish hook 15, and universal swivel 16 may be housed within the handle 10 for easy transportation.

The upper end of the handle 10 as illustrated in FIGURE 1, includes a threaded opening 17 arranged to receive the threaded end portion 18 of a shaft having an enlarged head 19 and smooth journaling or shaft portion 20. A reel structure 21 is rotatably mounted on the smooth shaft portion 20 and includes rear and forward flanges 22 and 23. As shown, the forward flange 23 is provided with a smoothly rounded or beveled inner side surface 24. The arrangement is such that a fishing line 25 wound on the reel 21 may easily ride over the beveled portion 24 of the front flange 23 when the device is used for casting.

The assembly is completed by a friction providing nut 26 having a friction surface 27 arranged to be placed in frictional engagement with the bottom surface of the rear flange 22 when the nut 27 is threaded on the threaded portion 18 against this surface.

The reel structure 21 itself may be provided with a handle 28 spaced radially from the axis of the reel and secured to the forward outside surface of the flange 23 to permit winding of the line 25 on the reel.

A simple nut 29 may be positioned within the hollow interior portion of the handle 10 immediately below the threaded portion 17 to receive the threaded end of the shaft threaded portion 18 when assembling the reel to the handle. This assembled condition is illustrated in FIGURE 2 wherein it will be noted that the tackle equipment 14, 15 and 16 shown within the interior of the handle in FIGURE 1, has been attached to the end of the line 25 preparatory to being used.

It will be clear from the illustration in FIGURE 2 that the knurl nut 26 is in a convenient position for rotative movement by the user's thumb as he holds the handle 10. Thus, the device may be controlled and operated with one hand.

In operation, the fishing apparatus may be used as a simple drop line by grasping the handle 10 with the thumb on the friction providing nut 26 and threading the nut 26 away from the flange 22 the reel to permit the sinker 14 to pull the line from the reel while holding the reel suspended over the edge of the dock or wharf. The line simply then drops in the water with the reel spinning freely. When a desired depth is reached, the user need only thread the friction providing nut 26 against the rear surface of the flange 22 to hold the reel in a given rotative position. When a fish has been hooked, the user may readily release the nut 26 with one hand while grasping the handle 28 with his other hand to wind up the reel.

When using the device in a casting operation, the user will attach the sinker 14 and remaining tackle as illustrated in FIGURE 2, and with the nut 26 locking the reel against rotation, simply swing the entire apparatus in a wide arc with his arm, thereby permitting the sinker 14 to pull the line from the reel without the reel rotating. There is very little friction to this unwinding of the line from the reel in view of the rounded surface 24 formed on the forward flange surface 23. After the casting operation, when a fish is hooked, the fisherman may wind up the reel as described heretofore with respect to simple drop line fishing.

Should the fisherman desire to provide a float on the line 25, he may easily use the cork 13 for this purpose. Thus, the cork may be secured to the line at a given distance from the sinker 14 so that it will fix a given depth at which the hook will be suspended.

It will also be clear as mentioned heretofore, that this float serves the additional function of closing the access opening in the handle 10 after the fisherman has completed his fishing operation for convenient storing of the tackle equipment.

From the foregoing description, it will thus be evident that the present invention has provided a greatly improved fishing apparatus. Not only is the device compact, portable, and very easily used, but its very construction is rugged and reliable in view of the minimum number of parts employed.

While only one particular embodiment has been set forth and described, the invention is not to be thought of as limited thereto but rather to encompass all such changes within the scope and spirit of the invention as would occur to those skilled in the art.

What is claimed is:

1. A fishing apparatus comprising, in combination: an elongated hollow handle terminating at one end in a threaded opening; a journalling shaft in axial alignment with said handle and having a threaded end portion at one end threadedly received in said opening, the other end of said handle including an opening communicating with said threaded opening so that the end of said threaded end portion of said shaft extends into the interior of said handle; means secured to said one end of said handle to secure said shaft in axial alignment with said handle, the other end of said shaft terminating in an enlarged head; a friction providing nut threaded on said threaded end portion of said shaft adjacent to said threaded opening; and a reel rotatably mounted on said shaft and axially positioned between said friction providing nut and said enlarged head whereby said friction providing nut may be rotated on said threaded portion by a user's thumb while holding said handle into frictional engagement with said reel to hold said reel against said enlarged head in a given rotative position.

2. An apparatus according to claim 1, including a fishing line wound on said reel, said other end of said handle defining an access opening; and a float in the form of a cork serving the dual function of first, closing said access opening to enable fishing tackle to be carried in the interior of said handle; and, second, providing a float for said fishing line when fishing with said tackle.

3. An apparatus according to claim 1, in which said reel includes a fishing line wound thereabout and is defined in part by rear and forward flanges, the inner side surface of said forward flange being beveled to provide a smooth surface over which the end portion of said fishing line can ride when cast from said reel.

References Cited by the Examiner

UNITED STATES PATENTS

| 2,505,151 | 4/1950 | Schweitz | 242—96 |
| 2,626,763 | 1/1953 | Dunnock | 242—99 X |
| 2,684,550 | 7/1954 | Reid | 43—54.5 |
| 2,753,131 | 7/1956 | Erdman | 242—84.2 |

SAMUEL KOREN, *Primary Examiner.*

D. J. LEACH, *Assistant Examiner.*